United States Patent
Yokoya (10) Patent No.: US 12,050,364 B2
(45) Date of Patent: Jul. 30, 2024

(54) OPTICAL SYSTEM, LENS APPARATUS, IMAGE PICKUP APPARATUS, AND IMAGING SYSTEM

(71) Applicant: CANON KABUSHIKI KAISHA, Tokyo (JP)

(72) Inventor: Maki Yokoya, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/985,966

(22) Filed: Nov. 14, 2022

(65) Prior Publication Data
US 2023/0185056 A1    Jun. 15, 2023

(51) Int. Cl.
*G02B 9/36* (2006.01)
*G02B 5/04* (2006.01)

(52) U.S. Cl.
CPC ..................... *G02B 9/36* (2013.01); *G02B 5/04* (2013.01)

(58) Field of Classification Search
CPC .... G02B 9/04–10; G02B 13/003; G02B 9/18; G02B 3/04; G02B 9/36; G02B 5/04; G02B 9/00–64; G02B 13/002–0045; G02B 9/08; G02B 9/12; G02B 9/34; G02B 9/60; G02B 9/62; G02B 9/64; G02B 15/0045; G02B 15/00; G02B 15/142; G02B 15/1425; G02B 15/143; G02B 15/1435; G02B 15/14301; G02B 15/143503; G02B 15/143507; G02B 23/00; G02B 23/02; G02B 23/14; G02B 23/145; G02B 23/125; G02B 13/0065; G02B 13/007; G02B 30/36; G02B 30/37; G02B 5/045; G02B 26/0883; G02B 3/0037; G02B 35/02; G02B 27/283; G02B 15/17; G02B 9/10; G02B 9/58; G02B 15/143505; G03B 35/02
USPC ....... 359/775, 708–718, 754, 755, 756, 761, 359/762, 763, 771, 784, 793
See application file for complete search history.

(56) References Cited

U.S. PATENT DOCUMENTS

| | | | |
|---|---|---|---|
| 11,194,138 B2 | 12/2021 | Yokoya | |
| 11,372,201 B2 | 6/2022 | Ino et al. | |
| 2012/0154552 A1* | 6/2012 | Wakazono | G03B 35/02 348/E13.074 |
| 2017/0108671 A1* | 4/2017 | Eguchi | G02B 13/06 |
| 2018/0326909 A1* | 11/2018 | Iwashita | G02B 13/006 |

(Continued)

FOREIGN PATENT DOCUMENTS

JP     2009-058817 A     3/2009

OTHER PUBLICATIONS

Gross H. et al. Handbook of Optical Systems vol. 3: Aberration Theory and Correction of Optical Systems Weinheim, Germany, Wiley-VCH Verlag Gmbh & Co. KGaA, 2007, pp. 337-339 (Year: 2007).*

(Continued)

*Primary Examiner* — Cara E Rakowski
(74) *Attorney, Agent, or Firm* — Carter, DeLuca & Farrell LLP (57) ABSTRACT

An optical system includes, in order from an object side to an image side, a first lens unit having negative refractive power, an aperture stop, and a second lens unit having positive refractive power. The first lens unit includes a first lens having negative refractive power disposed closest to an object. The first lens has a meniscus shape that is convex to the object side. A predetermined condition is satisfied.

17 Claims, 6 Drawing Sheets

(56) References Cited

U.S. PATENT DOCUMENTS

2019/0212525 A1\* 7/2019 Abe ....................... G02B 13/06
2020/0014908 A1\* 1/2020 Ebe ................... G02B 13/0065
2023/0014923 A1 1/2023 Yokoya

OTHER PUBLICATIONS

Gross, Handbook of Optical Systems (Year: 2007).\*

\* cited by examiner

OPTICAL SYSTEM, LENS APPARATUS, IMAGE PICKUP APPARATUS, AND IMAGING SYSTEM

BACKGROUND

Technical Field

One of the aspects of the disclosure relates to an optical system, a lens apparatus, an image pickup apparatus, and an imaging system.

Description of the Related Art

There has recently been demanded an image pickup apparatus that can capture an image with a full angle of view of approximately 180° in order to capture an ultra-wide-angle image that covers a field of view for content that provides a sense of presence such as virtual reality ("VR"). Japanese Patent Laid-Open No. ("JP") 2009-058817 proposes an optical system having an angle of view of approximately 180°.

The super-wide-angle lens such as that disclosed in JP 2009-058817 often includes a negative meniscus lens having a large curvature disposed closest to the object but in this case is likely to cause ghost light, which is generated by light that is reflected by another lens on the image side, then is reflected by the meniscus lens closest to the object, and reaches the image plane.

SUMMARY

One of the aspects of the disclosure provides an optical system, a lens apparatus, an image pickup apparatus, and an imaging system, each of which can reduce ghost light and have a super wide angle and high performance.

An optical system according to one aspect of the disclosure includes, in order from an object side to an image side, a first lens unit having negative refractive power, an aperture stop, and a second lens unit having positive refractive power. The first lens unit includes a first lens having negative refractive power disposed closest to an object. The first lens has a meniscus shape that is convex to the object side. The following inequality is satisfied:

$$14.2 < dG1P/f < 34.5$$

where dG1P is a distance on an optical axis from a surface on the object side of the first lens to the aperture stop, and f is a focal length of the optical system. Each of a lens apparatus, an image pickup apparatus, and an imaging system according to another aspect of the disclosure also includes the above optical system.

Further features of the disclosure will become apparent from the following description of exemplary embodiments with reference to the attached drawings.

DESCRIPTION OF THE EMBODIMENTS

Referring now to the accompanying drawings, a detailed description will be given of embodiments according to the disclosure. Corresponding elements in respective figures will be designated by the same reference numerals, and a duplicate description thereof will be omitted.

FIGS. 1, 3, 5, and 7 are sectional views of optical systems according to Examples 1 to 4, respectively. In each sectional view, a left side is an object side and a right side is an image side. The optical system according to each example includes a plurality of lens units. The lens unit may include an aperture stop (diaphragm).

The optical system according to each example includes, in order from the object side to the image side, a first lens unit L1 having negative refractive power, an aperture stop SP, and a second lens unit L2 having positive refractive power. In each sectional view, Li denotes an i-th lens unit (where i is a natural number) counted from the object side among lens units included in the optical system. IP denotes an image plane. In a case where the optical system according to each example is used as an imaging optical system for a digital still camera or a digital video camera, an imaging plane of a solid-state image sensor (photoelectric conversion element) such as a CCD sensor or a CMOS sensor is placed on the image plane IP. In a case where the optical system according to each example is used as an imaging optical system for a film-based camera, a photosensitive surface corresponding to a film plane is placed on the image plane IP.

FIGS. 2, 4, 6, and 8 are longitudinal aberration diagrams of the optical systems according to Examples 1 to 4, respectively. A spherical aberration diagram indicates spherical aberration amounts for the d-line (wavelength 587.6 nm) and g-line (wavelength 435.8 nm) where Fno denotes an F-number (aperture value). In an astigmatism diagram, ΔS denotes an astigmatism amount on a sagittal image plane, and ΔM denotes an astigmatism amount on a meridional image plane. A distortion diagram illustrates a distortion amount for the d-line. A chromatic aberration diagram illustrates a chromatic aberration amount for the g-line. ω denotes an imaging half angle of view(°.

A description will now be given of a characteristic configuration of the optical system according to each example.

A first lens G1 having negative refractive power is disposed closest to the object. The first lens G1 has a meniscus shape that is convex to the object side. This configuration can realize an ultra-wide-angle optical system.

The optical system according to each example satisfies the following inequality (1).

$$14.2 < dG1P/f < 34.5 \qquad (1)$$

where dG1P is a distance on an optical axis from a surface on the object side of the first lens G1 to the aperture stop SP, and f is a focal length of the optical system in each example.

In a case where ghost light reflected by the first lens G1 has an angle to the optical axis, as the distance on the optical axis from the first lens G1 to the aperture stop SP becomes longer, the ghost light moves to the outside of the effective diameters of the aperture stop SP and the lens disposed on the object side of the aperture stop SP and is less likely to reach the image plane IP. In a case where the distance on the optical axis from the first lens G1 to the aperture stop SP becomes shorter and the value is lower than the lower limit of inequality (1), the ghost light is likely to reach the image plane IP through the effective diameter of each lens surface. In a case where the value is higher than the upper limit of inequality(1), the first lens unit L1 becomes larger and it becomes difficult to correct off-axis aberrations.

The above configuration can realize an optical system that can reduce ghost light while maintaining an ultra-wide angle and high performance.

The numerical range of inequality (1) may be replaced with that of inequality (1a) below:

$$15.8<dG1P/f<31.2 \tag{1a}$$

The numerical range of inequality (1) may be replaced with that of inequality (1b) below:

$$16.2<dG1P/f<27.0 \tag{1b}$$

A description will now be given of the conditions that the optical system according to each example may satisfy.

The first lens unit L1 includes a second lens G2 disposed adjacent to the image side of the first lens G1, and the optical system according to each example may satisfy the following inequality (2):

$$4.2<RG2min/f<16.0 \tag{2}$$

where RG2min is an absolute value of a radius of curvature of one of a surface on the object side of the second lens G2 and a surface on the image side of the second lens G2, which one has a smaller absolute value of the radius of curvature.

In a case where the curvature of the second lens G2 increases and the value is lower than the lower limit of inequality(2), the ghost light reflected by the second lens G2 is likely to reach the inside of the effective diameter of the first lens G1. Therefore, the ghost light reflected between the second lens G2 and the first lens G1 is likely to reach the image plane IP, and a ring-shaped ghost is likely to occur. If the value is higher than the upper limit of inequality(2) and the curvature of the second lens G2 becomes small, the refractive power of the second lens G2 becomes small, resulting in insufficient corrections of distortion and image plane aberration.

The first lens unit L1 includes a third lens disposed adjacent to the image side of the second lens, and the optical system according to each example may satisfy the following inequality (3):

$$4.2<RG3min/f<18.9 \tag{3}$$

where RG3min is an absolute value of a radius of curvature of one of a surface on the object side of the third lens G3 and a surface on the image side of the third lens G3, which one has a smaller absolute value of the radius of curvature.

In a case where the value is lower than the lower limit of inequality (3) and the curvature of the third lens G3 increases, ghost light reflected by the third lens G3 is likely to reach the inside of the effective diameter of the first lens G1. Hence, the ghost light reflected between the third lens G3 and the first lens G1 is likely to reach the image plane IP, and a ring-shaped ghost is likely to occur. In a case where the value is higher than the upper limit of inequality(3) and the curvature of the third lens G3 becomes small, the refractive power of the third lens G3 becomes small, resulting in insufficient corrections of distortion and image plane aberration.

The optical system according to each example may satisfy the following inequality (4):

$$4.2<Rmin/f<16.0 \tag{4}$$

where Rmin is an absolute value of a radius of curvature of one of surfaces on the object side and the image side of all lenses excluding the first lens G1 included in the first lens unit L1, which one has the smallest absolute value of the radius of curvature.

In a case where the curvature of the lens included in the first lens unit L1 becomes large and the value is lower than the lower limit of inequality (4), the ghost light reflected by the lens included in the first lens unit L1 is likely to reach the inside of the effective diameter of the first lens G1. Hence, the ghost light reflected between the lens included in the first lens unit L1 and the first lens G1 is likely to reach the image plane IP, and a ring-shaped ghost is likely to occur. In a case where the value is higher than the upper limit of inequality (4) and the curvature of the lens included in the first lens unit L1 becomes small, the refractive power of the lens included in the first lens unit L1 becomes small, resulting in insufficient corrections of distortion and image plane aberration.

The optical system according to each example may satisfy the following inequality (5):

$$25.0<L/f<46.0 \tag{5}$$

where L is a distance on the optical axis from the surface on the object side of the first lens G1 to the image plane.

In a case where the distance on the optical axis from the surface on the object side of the first lens G1 to the image plane increases and ghost light reflected by the first lens G1 has an angle to the optical axis, the ghost light moves to the outside of the effective diameters of the aperture stop SP and the lens and is less likely to reach the image plane IP. In a case where the distance on the optical axis from the surface on the object side of the first lens G1 to the image plane becomes short and the value is lower than the lower limit of inequality(5), ghost light is likely to reach the image plane IP. In a case where the distance on the optical axis from the surface on the object side of the first lens G1 to the image plane becomes long and the value becomes higher than the upper limit of inequality (5), the first lens unit L1 becomes larger and it becomes difficult to correct off-axis aberrations.

The optical system according to each example may satisfy the following inequality (6):

$$1.6<(R1+R2)/(R1-R2)<3.0 \tag{6}$$

where R1 is a radius of curvature of the surface on the object side of the first lens G1, and R2 is a radius of curvature of a surface on the image side of the first lens G1.

Inequality (6) defines a shape factor (lens shape) of the first lens G1. In a case where the radius of curvature of the surface on the image side of the first lens G1 becomes smaller and the value becomes lower than the lower limit of inequality (6), the ghost light reflected by the surface on the image side is likely to reach the inside of the effective diameter and the ghost light is likely to occur. In addition, the refractive power of the first lens G1 becomes large, and the distortion becomes too large. In a case where the value is higher than the upper limit of inequality (6), the negative refractive power of the first lens G1 becomes weak and it becomes difficult to capture ultra-wide-angle rays.

The optical system according to each example may satisfy the following inequality (7):

$$3.0 < D12/f < 5.6 \quad (7)$$

where D1 is a distance on the optical axis from the surface on the image side of the first lens G1 to the surface on the object side of the second lens G2.

In a case where the distance on the optical axis from the surface on the image side of the first lens G1 to the surface on the object side of the second lens G2 becomes long, the ghost light reflected by the second lens G2 is likely to move toward the outside of the effective diameter of the first lens G1 and the ghost light is less likely to reach the image plane IP. In a case where the value is lower than the lower limit of inequality (7), the ghost light reflected between the second lens G2 and the first lens G1 is likely to reach the image plane IP and a ring-shaped ghost is likely to occur. In a case where the distance on the optical axis from the surface on the image side of the first lens G1 to the surface on the object side of the second lens G2 becomes long and the value is higher than the upper limit of inequality (7), a height of an off-axis ray passing through the second lens G2 becomes low and it becomes difficult to correct off-axis aberrations by the second lens G2.

The optical system according to each example may satisfy the following inequality (8):

$$-8.0 < f1/f < -1.0 \quad (8)$$

where f1 is a focal length of the first lens unit L1.

In a case where the value is lower than the lower limit of inequality (8), the negative refractive power of the first lens unit L1 becomes large, distortion and curvature of field occur, and it becomes difficult to acquire high performance. In a case where the value is higher than the upper limit of inequality (8), the negative refractive power of the first lens unit L1 becomes small and it becomes difficult to capture ultra-wide-angle rays.

The optical system according to each example may satisfy the following inequality (9):

$$3.2 < f2/f < 8.7 \quad (9)$$

where f2 is a focal length of the second lens unit L2.

In a case where the value is higher than the lower limit of inequality (9), the positive refractive power of the second lens unit L2 becomes too large, aberrations generated in the second lens unit L2 cannot be sufficiently corrected, and it becomes difficult to improve high performance. In a case where the value is higher than the upper limit of inequality (9), the positive refractive power of the second lens unit L2 becomes small and it becomes difficult to correct aberrations generated in the first lens unit L1.

The numerical ranges of inequalities (2) to (9) may be replaced with those of inequalities (2a) to (9a) below:

$$4.3 < RG2\min/f < 15.5 \quad (2a)$$

$$4.5 < RG3\min/f < 17.5 \quad (3a)$$

$$4.3 < R\min/f < 15.5 \quad (4a)$$

$$29.0 < L/f < 43.0 \quad (5a)$$

$$1.7 < (R1-R2)/(R1-R2) < 2.7 \quad (6a)$$

$$3.2 < D12/f < 5.3 \quad (7a)$$

$$-7.5 < f1/f < -2.0 \quad (8a)$$

$$3.8 < f2/f < 7.8 \quad (9a)$$

The numerical ranges of inequalities (2) to (9) may be replaced with those of inequalities (2b) to (9b) below:

$$4.5 < RG2\min/f < 13.8 \quad (2b)$$

$$5.3 < RG3\min/f < 16.2 \quad (3b)$$

$$4.5 < R\min/f < 13.8 \quad (4b)$$

$$31.0 < L/f < 40.0 \quad (5b)$$

$$1.8 < (R1-R2)/(R1-R2) < 2.5 \quad (6b)$$

$$3.5 < D12/f < 5.0 \quad (7b)$$

$$-6.5 < f1/f < -2.5 \quad (8b)$$

$$4.8 < f2/f < 7.0 \quad (9b)$$

A detailed description will now be given of the optical system according to each example.

The optical system according to each example includes, in order from the object side to the image side, the first lens unit L1 having negative refractive power, the aperture stop SP, and the second lens unit L2 having positive refractive power. The first lens G1 having negative refractive power is disposed closest to the object, and the first lens G1 has a meniscus shape that is convex to the object side.

Figure 1:
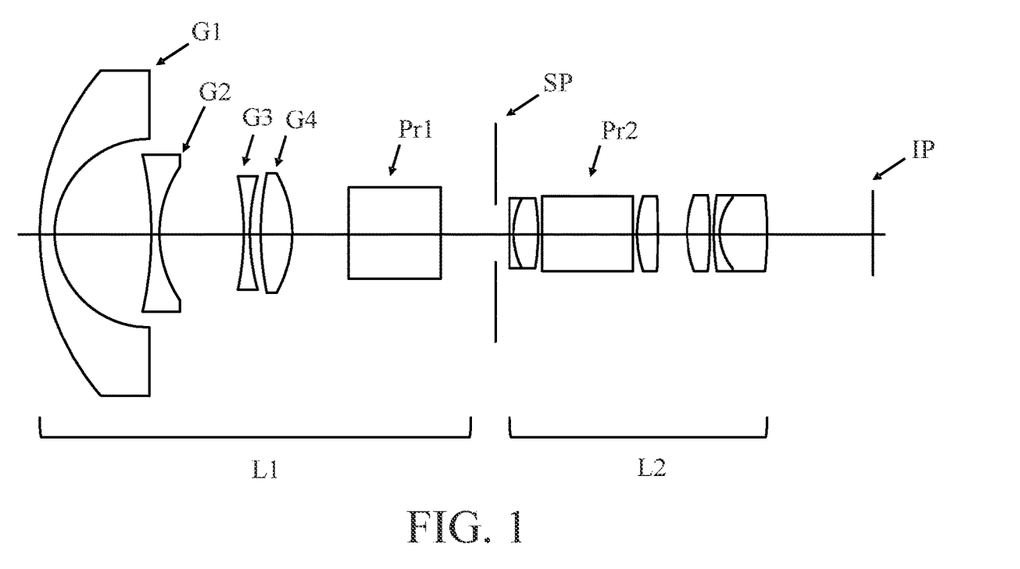
FIG. 1 is a sectional view of an optical system according to Example 1.
Figure 2:
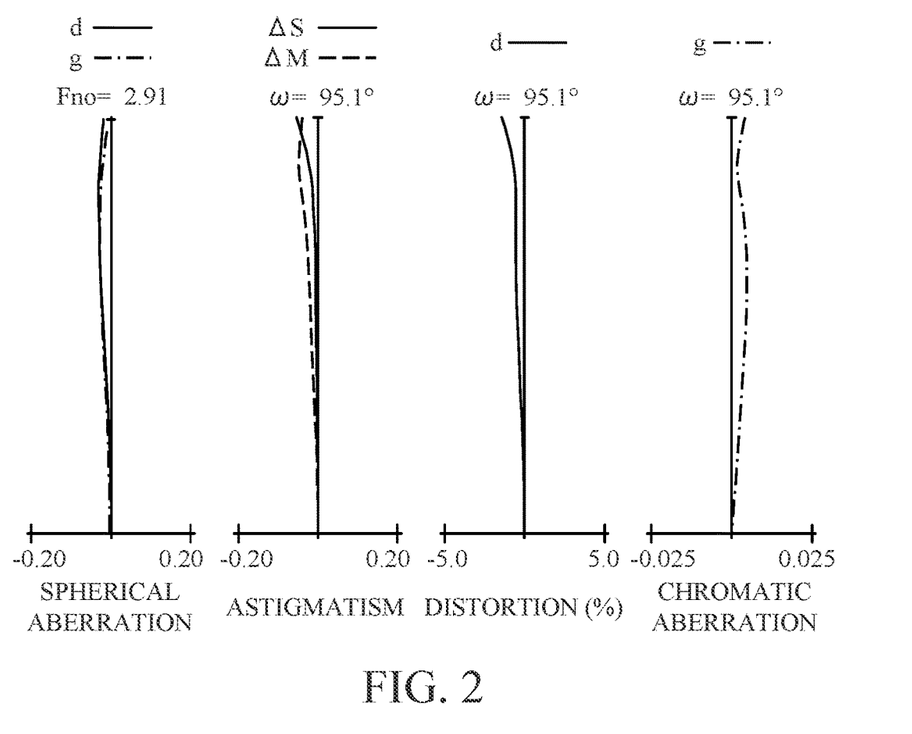
FIG. 2 is a longitudinal aberration diagram of the optical system according to Example 1.
Figure 3:
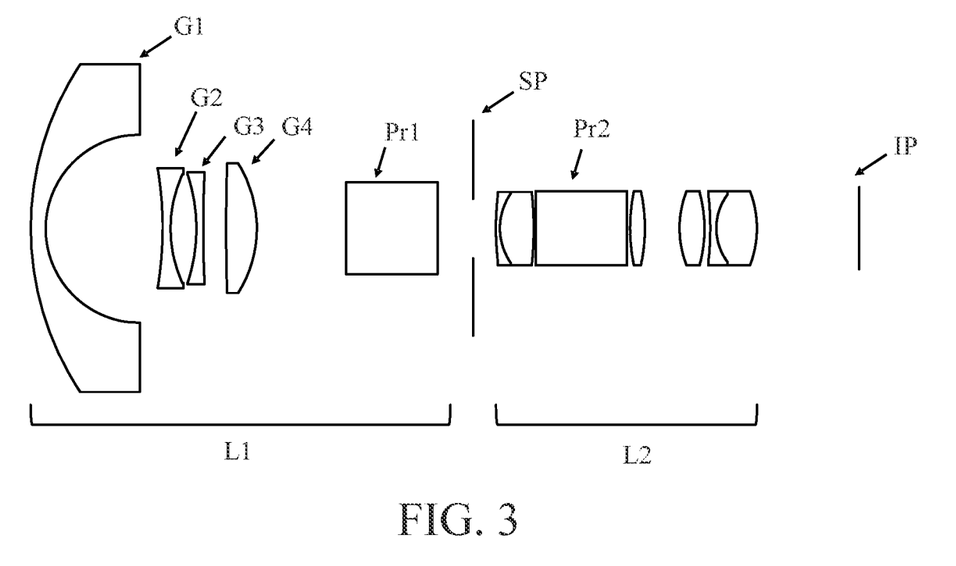
FIG. 3 is a sectional view of an optical system according to Example 2.
Figure 4:
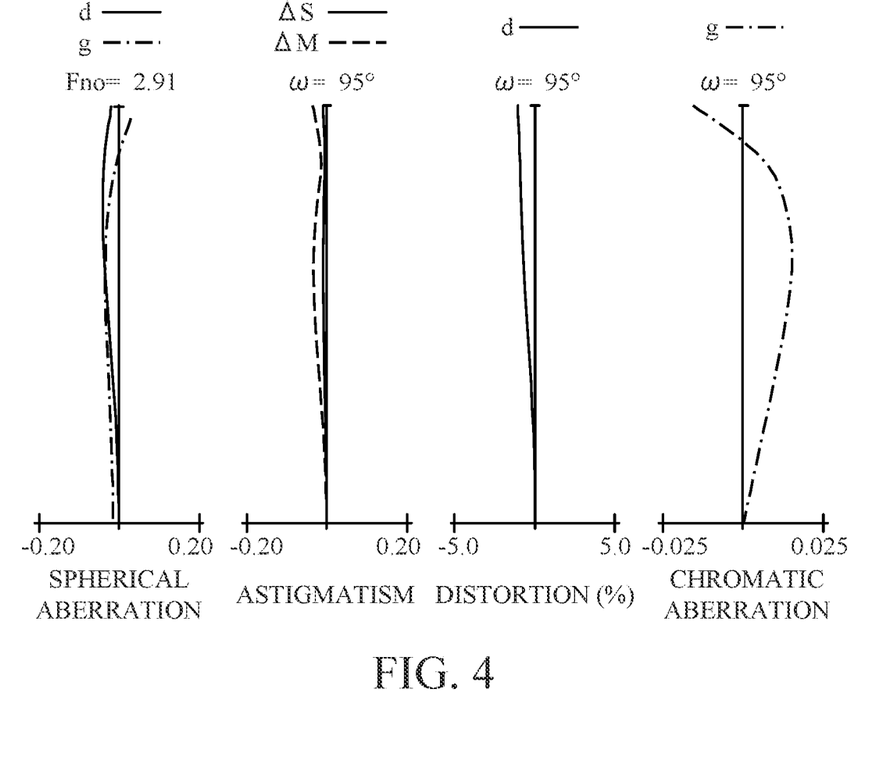
FIG. 4 is a longitudinal aberration diagram of the optical system according to Example 2.
Figure 5:
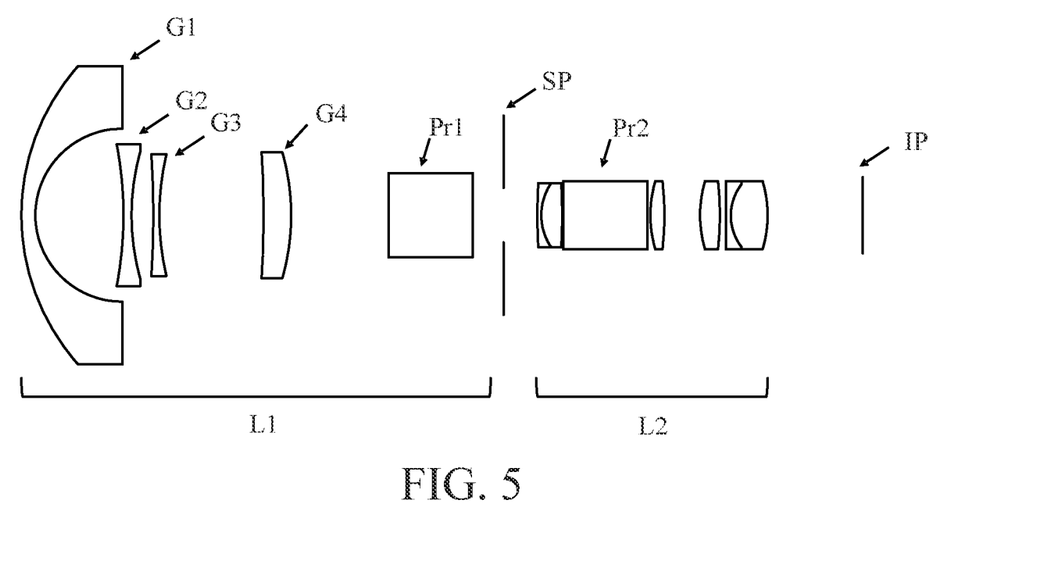
FIG. 5 is a sectional view of an optical system according to Example 3.
Figure 6:
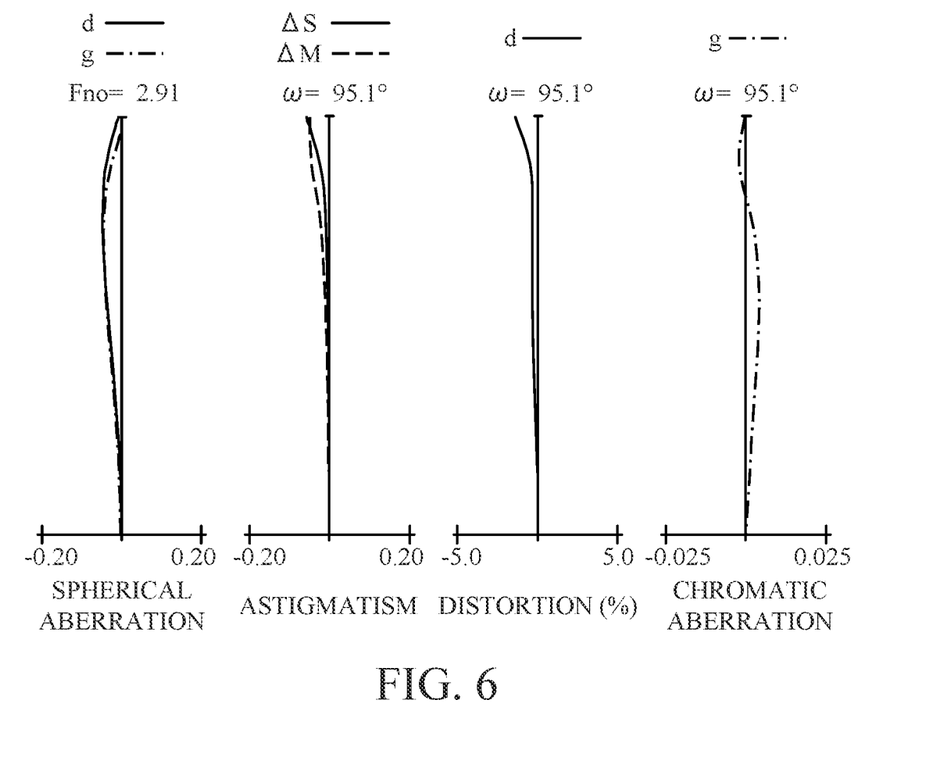
FIG. 6 is a longitudinal aberration diagram of the optical system according to Example 3.

In the optical systems according to Examples 1 to 3, the first lens unit L1 includes, in order from the object side to the image side, the first lens G1, the second lens G2, the third lens G3, a fourth lens G4, and a prism Pr1.

Figure 7:
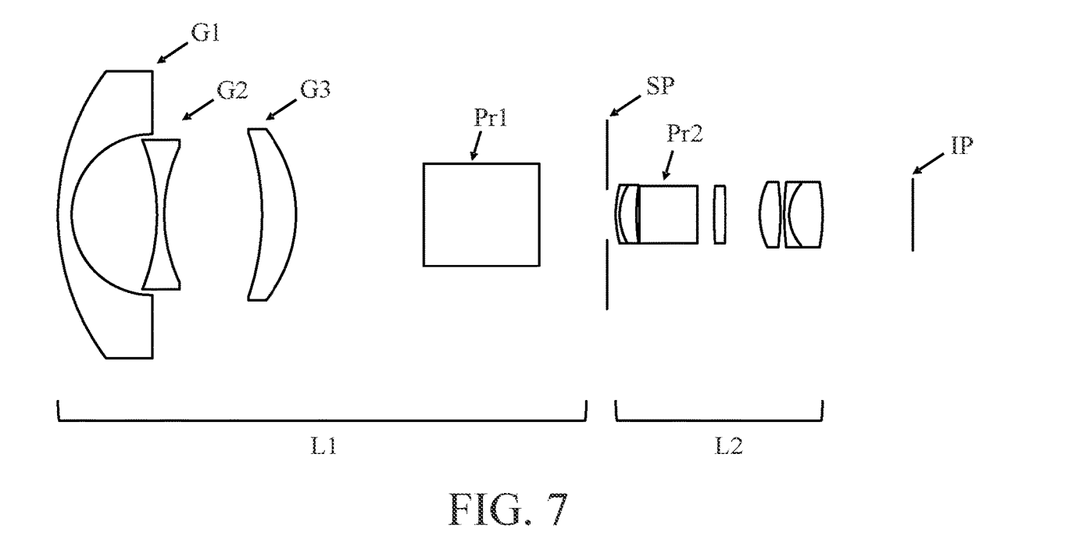
FIG. 7 is a sectional view of an optical system according to Example 4.
Figure 8:
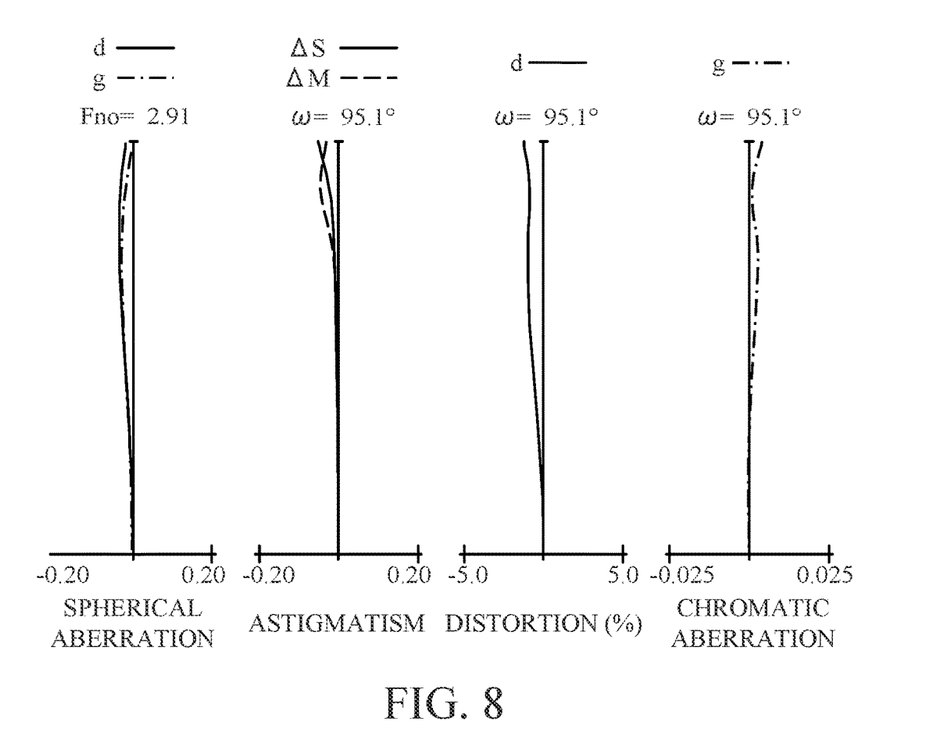
FIG. 8 is a longitudinal aberration diagram of the optical system according to Example 4.

In the optical system according to Example 4, the first lens unit L1 includes, in order from the object side to the image side, the first lens G1, the second lens G2, the third lens G3, and the prism Pr1.

The first lens unit L1 includes the prism Pr1 in each example, but may not include it. The prism Pr1 may or may not have refractive power.

In the optical system according to each example, the second lens unit L2 includes a prism Pr2.

Numerical Examples 1 to 4 corresponding to Examples 1 to 4 will be illustrated below.

In surface data of each numerical example, r denotes a radius of curvature of each optical surface, and d (mm) denotes an on-axis distance (distance on the optical axis) between an m-th surface and an (m+1)-th surface, where m is a surface number counted from the light incident side. nd denotes a refractive index for the d-line of each optical element, and vd denotes an Abbe number of the optical element. The Abbe number vd of a certain material is expressed as follows:

$$vd = (Nd-1)/(NF-NC)$$

where Nd, NF, and NC are refractive indexes based on the d-line (587.6 nm), the F-line (486.1 nm), and the C-line (656.3 nm) in the Fraunhofer line, respectively.

A "back focus" is a distance on the optical axis from the final lens surface (lens surface closest to the image plane) to a paraxial image surface converted into an air conversion length. An "overall lens length" is a length obtained by adding the back focus to a distance on the optical axis from a front surface (lens surface closest to the object) of the optical system to the final surface.

[NUMERICAL EXAMPLE 1]
UNIT: mm

Surface Data

| Surface No. | r | d | nd | vd |
|---|---|---|---|---|
| 1 | 31.291 | 1.90 | 2.00100 | 29.1 |
| 2 | 11.855 | 12.09 | | |
| 3 | −45.428 | 1.05 | 1.71300 | 53.9 |
| 4 | 15.009 | 10.52 | | |
| 5 | −35.359 | 0.85 | 1.90043 | 37.4 |
| 6 | 28.556 | 1.35 | | |
| 7 | 41.900 | 3.90 | 1.60342 | 38.0 |
| 8 | −15.226 | 7.10 | | |
| 9 | ∞ | 11.37 | 1.85150 | 40.8 |
| 10 | ∞ | 6.96 | | |
| 11(ST) | ∞ | 1.74 | | |
| 12 | −358.576 | 0.50 | 1.75500 | 52.3 |
| 13 | 10.047 | 3.13 | 1.59270 | 35.3 |
| 14 | −21.792 | 0.50 | | |
| 15 | ∞ | 11.37 | 1.85150 | 40.8 |
| 16 | ∞ | 0.50 | | |
| 17 | 16.882 | 2.50 | 1.48749 | 70.2 |
| 18 | −143.856 | 3.78 | | |
| 19 | 15.011 | 2.75 | 1.49700 | 81.6 |
| 20 | −44.314 | 0.59 | | |
| 21 | 39.517 | 0.75 | 2.00069 | 25.5 |
| 22 | 7.122 | 5.92 | 1.49700 | 81.6 |
| 23 | −38.109 | 13.21 | | |
| Image Plane | ∞ | | | |

Various data

| | |
|---|---|
| Focal Length | 3.21 |
| FNO | 2.91 |
| Half Angle of View (degree) | 95.1 |
| Image Height | 5.25 |
| Overall lens length | 104.33 |
| BF | 13.21 |

Lens Unit Data

| Lens Unit | Starting Surface | Focal Length |
|---|---|---|
| L1 | 1 | −9.38 |
| L2 | 12 | 18.82 |

SINGLE LENS DATA

| Lens | Starting Surface | Focal Length |
|---|---|---|
| 1 | 1 | −20.05 |
| 2 | 3 | −15.71 |
| 3 | 5 | −17.43 |
| 4 | 7 | 19.00 |
| 5 | 9 | 0.00 |
| 6 | 12 | −12.94 |
| 7 | 13 | 12.04 |
| 8 | 15 | 0.00 |
| 9 | 17 | 31.15 |
| 10 | 19 | 22.91 |
| 11 | 21 | −8.78 |
| 12 | 22 | 12.62 |

[NUMERICAL EXAMPLE 2]
UNIT: mm

Surface Data

| Surface No. | r | d | nd | vd |
|---|---|---|---|---|
| 1 | 38.234 | 1.90 | 2.00100 | 29.1 |
| 2 | 12.083 | 14.92 | | |
| 3 | −52.303 | 1.05 | 2.00100 | 29.1 |
| 4 | 15.958 | 3.39 | | |
| 5 | −20.211 | 0.85 | 1.95375 | 32.3 |
| 6 | 430.947 | 2.92 | | |
| 7 | 251.947 | 3.90 | 1.76182 | 26.5 |
| 8 | −15.877 | 11.47 | | |
| 9 | ∞ | 11.69 | 1.51633 | 64.1 |
| 10 | ∞ | 4.58 | | |
| 11(ST) | ∞ | 2.95 | | |
| 12 | 48.345 | 0.50 | 1.77250 | 49.6 |
| 13 | 8.249 | 4.33 | 1.59551 | 39.2 |
| 14 | −31.525 | 0.15 | | |
| 15 | ∞ | 11.69 | 1.51633 | 64.1 |
| 16 | ∞ | 0.50 | | |
| 17 | 30.953 | 1.81 | 1.49700 | 81.6 |
| 18 | −27.246 | 4.52 | | |
| 19 | 13.258 | 3.12 | 1.49700 | 81.6 |
| 20 | −18.661 | 0.76 | | |
| 21 | −35.746 | 0.75 | 2.00100 | 29.1 |
| 22 | 7.125 | 5.17 | 1.48749 | 70.2 |
| 23 | −13.655 | 13.21 | | |
| Image Plane | ∞ | | | |

Various data

| | |
|---|---|
| Focal Length | 3.20 |
| FNO | 2.91 |
| Half Angle of View (degree) | 90.0 |
| Image Height | 5.25 |
| Overall lens length | 106.12 |
| BF | 13.21 |

Lens Unit Data

| Lens Unit | Starting Surface | Focal Length |
|---|---|---|
| L1 | 1 | −9.07 |
| L2 | 12 | 20.32 |

SINGLE LENS DATA

| Lens | Starting Surface | Focal Length |
|---|---|---|
| 1 | 1 | −18.31 |
| 2 | 3 | −12.12 |
| 3 | 5 | −20.22 |
| 4 | 7 | 19.73 |
| 5 | 9 | 0.00 |
| 6 | 12 | −12.94 |
| 7 | 13 | 11.44 |
| 8 | 15 | 0.00 |
| 9 | 17 | 29.46 |
| 10 | 19 | 16.12 |
| 11 | 21 | −5.88 |
| 12 | 22 | 10.46 |

[NUMERICAL EXAMPLE 3]
UNIT: mm

Surface Data

| Surface No. | r | d | nd | vd |
|---|---|---|---|---|
| 1 | 31.436 | 1.90 | 2.00069 | 25.5 |
| 2 | 12.088 | 12.33 | | |
| 3 | −49.357 | 1.05 | 2.00100 | 29.1 |
| 4 | 32.411 | 3.00 | | |
| 5 | −112.521 | 0.85 | 2.00100 | 29.1 |
| 6 | 35.545 | 14.40 | | |
| 7 | −202.852 | 3.90 | 2.00100 | 29.1 |
| 8 | −32.408 | 13.54 | | |
| 9 | ∞ | 11.62 | 1.85150 | 40.8 |
| 10 | ∞ | 4.23 | | |
| 11(ST) | ∞ | 4.80 | | |
| 12 | 65.452 | 0.50 | 1.71999 | 50.2 |
| 13 | 8.044 | 2.90 | 1.59270 | 35.3 |

[NUMERICAL EXAMPLE 3]
UNIT: mm

| | | | | |
|---|---|---|---|---|
| 14 | −87.265 | 0.15 | | |
| 15 | ∞ | 11.62 | 1.85150 | 40.8 |
| 16 | ∞ | 0.50 | | |
| 17 | 17.805 | 1.91 | 1.48749 | 70.2 |
| 18 | −43.242 | 4.87 | | |
| 19 | 14.578 | 2.82 | 1.49700 | 81.6 |
| 20 | −35.244 | 0.78 | | |
| 21 | −736.379 | 0.75 | 2.00069 | 25.5 |
| 22 | 7.315 | 5.03 | 1.49700 | 81.6 |
| 23 | −19.079 | 13.21 | | |
| Image Plane | ∞ | | | |

Various data

| | |
|---|---|
| Focal Length | 3.21 |
| FNO | 2.91 |
| Half Angle of View (degree) | 90.1 |
| Image Height | 5.25 |
| Overall lens length | 116.66 |
| BF | 13.21 |

Lens Unit Data

| Lens Unit | Starting Surface | Focal Length |
|---|---|---|
| L1 | 1 | −16.26 |
| L2 | 12 | 21.14 |

SINGLE LENS DATA

| Lens | Starting Surface | Focal Length |
|---|---|---|
| 1 | 1 | −20.64 |
| 2 | 3 | −19.42 |
| 3 | 5 | −26.91 |
| 4 | 7 | 38.10 |
| 5 | 9 | 0.00 |
| 6 | 12 | −12.78 |
| 7 | 13 | 12.57 |
| 8 | 15 | 0.00 |
| 9 | 17 | 26.14 |
| 10 | 19 | 21.15 |
| 11 | 21 | −7.23 |
| 12 | 22 | 11.36 |

[NUMERICAL EXAMPLE 4]
UNIT: mm

Surface Data

| Surface No. | r | d | nd | vd |
|---|---|---|---|---|
| 1 | 34.986 | 1.90 | 2.00100 | 29.1 |
| 2 | 11.822 | 12.43 | | |
| 3 | −30.002 | 1.05 | 1.90043 | 37.4 |
| 4 | 22.685 | 14.27 | | |
| 5 | −37.095 | 5.04 | 1.90366 | 31.3 |
| 6 | −20.209 | 18.56 | | |
| 7 | ∞ | 16.90 | 1.85150 | 40.8 |
| 8 | ∞ | 10.00 | | |
| 9(ST) | ∞ | 1.26 | | |
| 10 | 16.261 | 0.50 | 1.90043 | 37.4 |
| 11 | 8.175 | 2.45 | 1.63980 | 34.5 |
| 12 | 33.379 | 0.41 | | |
| 13 | ∞ | 8.54 | 1.85150 | 40.8 |
| 14 | ∞ | 2.42 | | |
| 15 | 64.655 | 1.72 | 1.48749 | 70.2 |
| 16 | −38.843 | 5.00 | | |
| 17 | 11.372 | 2.91 | 1.49700 | 81.6 |
| 18 | −63.549 | 0.60 | | |
| 19 | 33.099 | 0.75 | 1.95375 | 32.3 |
| 20 | 6.951 | 4.80 | 1.49700 | 81.6 |
| 21 | −37.414 | 13.21 | | |
| Image Plane | ∞ | | | |

Various data

| | |
|---|---|
| Focal Length | 3.21 |
| FNO | 2.91 |
| Half Angle of View (degree) | 90.1 |
| Image Height | 5.25 |
| Overall lens length | 124.73 |
| BF | 13.21 |

Zoom Lens Unit Data

| Lens Unit | Starting Surface | Focal Length |
|---|---|---|
| L1 | 1 | −18.43 |
| L2 | 10 | 20.88 |

SINGLE LENS DATA

| Lens | Starting Surface | Focal Length |
|---|---|---|
| 1 | 1 | −18.60 |
| 2 | 3 | −14.21 |
| 3 | 5 | 43.03 |
| 4 | 7 | 0.00 |
| 5 | 10 | −18.81 |
| 6 | 11 | 16.30 |
| 7 | 13 | 0.00 |
| 8 | 15 | 50.05 |
| 9 | 17 | 19.66 |
| 10 | 19 | −9.36 |
| 11 | 20 | 12.23 |

Table 1 below summarizes various values in each numerical example below. In each numerical example, the d-line is used as a reference wavelength, and the values in Table 1 are acquired at the reference wavelength.

TABLE 1

| | Example 1 | Example 2 | Example 3 | Example 4 |
|---|---|---|---|---|
| Inequality (1) | 17.79 | 17.72 | 20.82 | 25.00 |
| Inequality (2) | 4.68 | 4.99 | 10.10 | 7.07 |
| Inequality (3) | 8.90 | 6.32 | 11.08 | 6.30 |
| Inequality (4) | 4.68 | 4.96 | 10.10 | 6.30 |
| Inequality (5) | 32.71 | 33.39 | 36.35 | 39.11 |
| Inequality (6) | 2.22 | 1.92 | 2.25 | 2.02 |
| Inequality (7) | 3.77 | 4.66 | 3.84 | 3.88 |
| Inequality (8) | −2.92 | −2.84 | −5.07 | −5.75 |
| Inequality (9) | 5.86 | 6.35 | 6.59 | 6.51 |

Lens Apparatus

Figure 9:
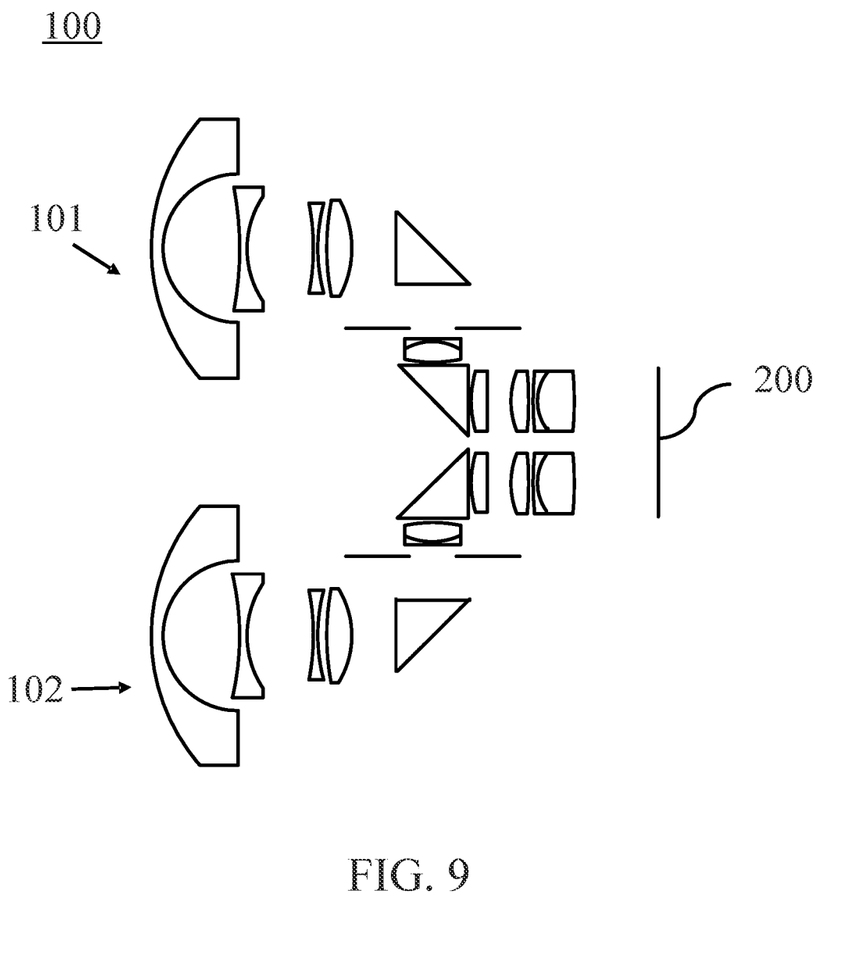
FIG. 9 explains a lens apparatus.
Figure 10:
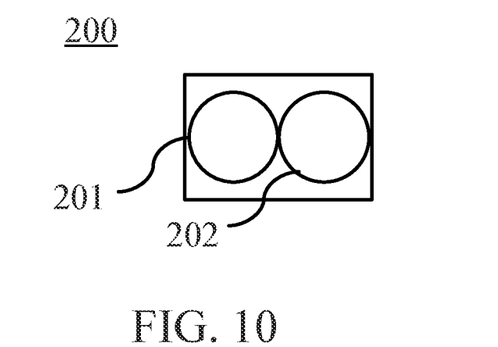
FIG. 10 schematically illustrates two image circles formed by two optical systems.

As illustrated in FIG. 9, a lens apparatus includes a first optical system 101 including the optical system according to each example, and a second optical system 102 including the optical system according to each example and disposed in parallel with the first optical system 101. As illustrated in FIG. 10, image circles 201 and 202 are formed by the first optical system 101 and the second optical system 102 and arranged side by side on an image sensor 200.

Image Pickup Apparatus

Figure 11:
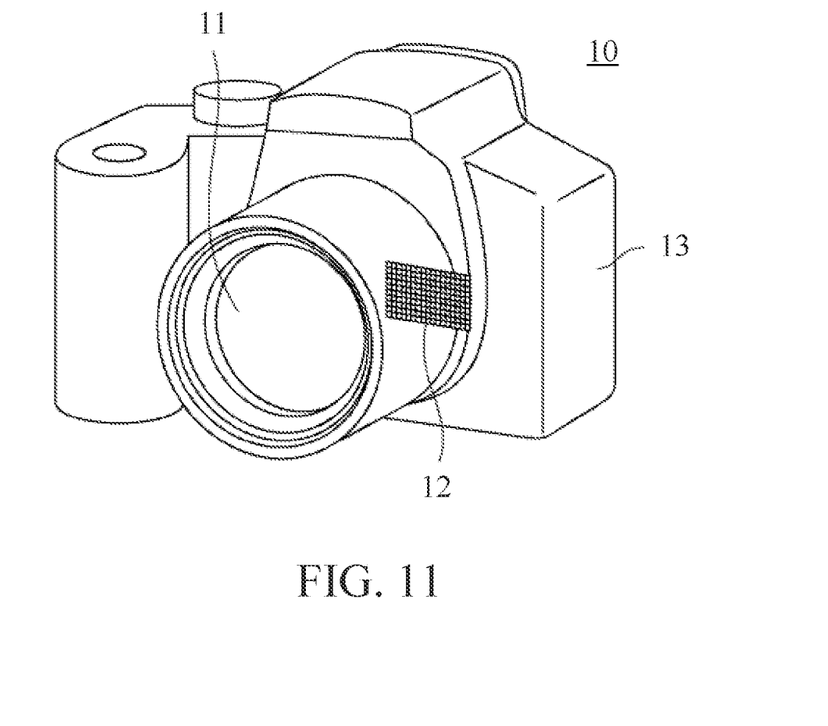
FIG. 11 schematically illustrates an image pickup apparatus.

Referring now to FIG. 11, a description will be given of an example of a digital still camera (image pickup apparatus) using the optical system according to each example as an imaging optical system. In FIG. 11, reference numeral 10 denotes a camera body, and reference numeral 11 denotes an imaging optical system that includes any one of the optical systems described in Examples 1 to 4. Reference numeral 12 denotes a solid-state image sensor (photoelectric conversion device) such as a CCD sensor or CMOS sensor, which is built in the camera body 10 and receives and photoelectrically converts an optical image formed by the imaging optical system 11. The camera body 10 may be a so-called single-lens reflex camera having a quick turn mirror, or a so-called mirrorless camera having no quick turn mirror.

Applying the optical system according to each example to an image pickup apparatus such as a digital still camera can provide an image pickup apparatus having a small lens.

Imaging System

An imaging system (surveillance camera system) may include the optical system according to each example and a control unit that controls the optical system. In this case, the control unit can control the optical system. At this time, the control unit does not have to be integrated with the optical system and may be separate from the optical system. For example, a configuration may be adopted in which a control unit (control apparatus) disposed at a remote location includes a transmission unit that transmits a control signal (command) for controlling the optical system. This control unit can remotely control the optical system.

By providing the control unit with an operation unit such as a controller and buttons for remotely operating the optical system, a configuration may be adopted in which the optical system is controlled according to an input of a user to the operation unit. For example, a button may be provided as the operation unit. In a case where the user presses a button, the control unit may send a signal to the optical system.

The imaging system may include a display unit such as a liquid crystal panel that displays information about the optical system. In this case, the user can remotely operate the optical system through the operation unit while viewing the information about the optical system displayed on the display unit. At this time, the display unit and the operation unit may be integrated with each other by adopting a touch panel or the like.

Each of the above examples can provide an optical system, a lens apparatus, an image pickup apparatus, and an imaging system, each of which can reduce ghost light and have an ultra-wide angle and high performance.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-202857, filed on Dec. 14, 2021, which is hereby incorporated by reference herein in its entirety.

What is claimed is:

1. An optical system comprising, in order from an object side to an image side, a first lens unit having negative refractive power, an aperture stop, and a second lens unit having positive refractive power,
   wherein the first lens unit includes a first lens having negative refractive power disposed closest to an object, and a second lens disposed adjacent to the image side of the first lens,
   wherein all lenses included in the first lens unit are disposed on the object side of the aperture stop,
   wherein the first lens has a meniscus shape that is convex to the object side, and
   wherein the following inequalities are satisfied:

$14.2 < dG1P/f < 34.5$ $3.0 < D12/f \leq 4.66$ $-8.0 < f1/f < -2.5$ $4.2 < RG2\min/f < 16.0$ where dG1P is a distance on an optical axis from a surface on the object side of the first lens to the aperture stop, f is a focal length of the optical system, D12 is a distance on the optical axis from a surface on the image side of the first lens to a surface on the object side of the second lens, f1 is a focal length of the first lens unit, and RG2min is an absolute value of a radius of curvature of one of a surface on the object side of the second lens and a surface on the image side of the second lens, which one has a smaller absolute value of the radius of curvature.

2. The optical system according to claim 1, wherein the first lens unit includes a third lens disposed adjacent to the image side of the second lens, and
   wherein the following inequality is satisfied:

$4.2 < RG3\min/f < 18.9$ where RG3min is an absolute value of a radius of curvature of one of a surface on the object side of the third lens and a surface on the image side of the third lens, which one has a smaller absolute value of the radius of curvature.

3. The optical system according to claim 1, wherein the following inequality is satisfied:

$4.2 < R\min/f < 16.0$ where Rmin is an absolute value of a radius of curvature of one of surfaces on the object side and the image side of all lenses excluding the first lens included in the first lens unit, which one has the smallest absolute value of the radius of curvature.

4. The optical system according to claim 1, wherein the following inequality is satisfied:

$25.0 < L/f < 46.0$ where L is a distance on the optical axis from the surface on the object side of the first lens to an image plane.

5. The optical system according to claim 1, wherein the following inequality is satisfied:

$1.6 < (R1+R2)/(R1-R2) < 3.0$ where R1 is a radius of curvature of the surface on the object side of the first lens and R2 is a radius of curvature of a surface on the image side of the first lens.

6. The optical system according to claim 1, wherein the following inequality is satisfied:

$3.2 < f2/f < 8.7$ where f2 is a focal length of the second lens unit.

7. An imaging system comprising:
   the optical system according to claim 1; and
   at least one processor or circuit configured to execute a plurality of tasks including a controlling task configured to control the optical system.

8. The imaging system according to claim 7, wherein the at least one processor or circuit is separate from the optical system, and includes a transmitter configured to transmit a control signal for controlling the optical system.

9. The imaging system according to claim 7, wherein the at least one processor or circuit is separate from the optical system, and is configured to operate the optical system.

10. The imaging system according to claim 7, further comprising a display unit configured to display information about the optical system.

11. The optical system according to claim 1, wherein the following inequality is satisfied:

$17.79 \leq dG1P/f \leq 25.00$.

12. The optical system according to claim 1, wherein the following inequality is satisfied:

$3.0 < D12/f \leq 3.88$.

13. The optical system according to claim 1, wherein the following inequality is satisfied:

$-6.5 < f1/f \leq -2.84$.

14. The optical system according to claim 1,
wherein the first lens unit includes three or fewer negative lenses, and
wherein at least one of the three or fewer negative lenses is a biconcave lens.

15. A lens apparatus comprising:
a first optical system; and
a second optical system disposed in parallel with the first optical system,
wherein each of the first optical system and the second optical system includes an optical system including, in order from an object side to an image side, a first lens unit having negative refractive power, an aperture stop, and a second lens unit having positive refractive power,
wherein the first lens unit includes a first lens having negative refractive power disposed closest to an object, and a second lens disposed adjacent to the image side of the first lens,
wherein all lenses included in the first lens unit are disposed on the object side of the aperture stop,
wherein the first lens has a meniscus shape that is convex to the object side, and
wherein the following inequalities are satisfied:

$14.2 < dG1P/f < 34.5$ $3.0 < D12/f \leq 4.66$ $-8.0 < f1/f < -2.5$ $4.2 < RG2min/f < 16.0$ where dG1P is a distance on an optical axis from a surface on the object side of the first lens to the aperture stop, f is a focal length of the optical system, D12 is a distance on the optical axis from a surface on the image side of the first lens to a surface on the object side of the second lens, f1 is a focal length of the first lens unit, and RG2min is an absolute value of a radius of curvature of one of a surface on the object side of the second lens and a surface on the image side of the second lens, which one has a smaller absolute value of the radius of curvature.

16. An image pickup apparatus comprising:
an optical system; and
an image sensor configured to receive an image formed by the optical system,
wherein the optical system includes, in order from an object side to an image side, a first lens unit having negative refractive power, an aperture stop, and a second lens unit having positive refractive power,
wherein the first lens unit includes a first lens having negative refractive power disposed closest to an object, and a second lens disposed adjacent to the image side of the first lens,
wherein all lenses included in the first lens unit are disposed on the object side of the aperture stop,
wherein the first lens has a meniscus shape that is convex to the object side, and
wherein the following inequalities are satisfied:

$14.2 < dG1P/f < 34.5$ $3.0 < D12/f \leq 4.66$ $-8.0 < f1/f < -2.5$ $4.2 < RG2min/f < 16.0$ where dG1P is a distance on an optical axis from a surface on the object side of the first lens to the aperture stop, f is a focal length of the optical system, D12 is a distance on the optical axis from a surface on the image side of the first lens to a surface on the object side of the second lens, f1 is a focal length of the first lens unit, and RG2min is an absolute value of a radius of curvature of one of a surface on the object side of the second lens and a surface on the image side of the second lens, which one has a smaller absolute value of the radius of curvature.

17. An optical system comprising, in order from an object side to an image side, a first lens unit having negative refractive power, an aperture stop, and a second lens unit having positive refractive power,
wherein the first lens unit includes a first lens having negative refractive power disposed closest to an object, and a second lens disposed adjacent to the image side of the first lens,
wherein all lenses included in the first lens unit are disposed on the object side of the aperture stop,
wherein the first lens has a meniscus shape that is convex to the object side, and
wherein the following inequalities are satisfied:

$14.2 < dG1P/f < 34.5$ $3.0 < D12/f \leq 4.66$ $-8.0 < f1/f < -2.5$ $4.2 < Rmin/f < 16.0$ where dG1P is a distance on an optical axis from a surface on the object side of the first lens to the aperture stop, f is a focal length of the optical system, D12 is a distance on the optical axis from a surface on the image side of the first lens to a surface on the object side of the second lens, f1 is a focal length of the first lens unit, and Rmin is an absolute value of a radius of curvature of one of surfaces on the object side and the image side of all lenses excluding the first lens included in the first lens unit, which one has the smallest absolute value of the radius of curvature.

* * * * *